(No Model.) 3 Sheets—Sheet 1.
G. A. LA FEVER.
BELL CORD ATTACHMENT.
No. 443,396. Patented Dec. 23, 1890.
Fig. 1
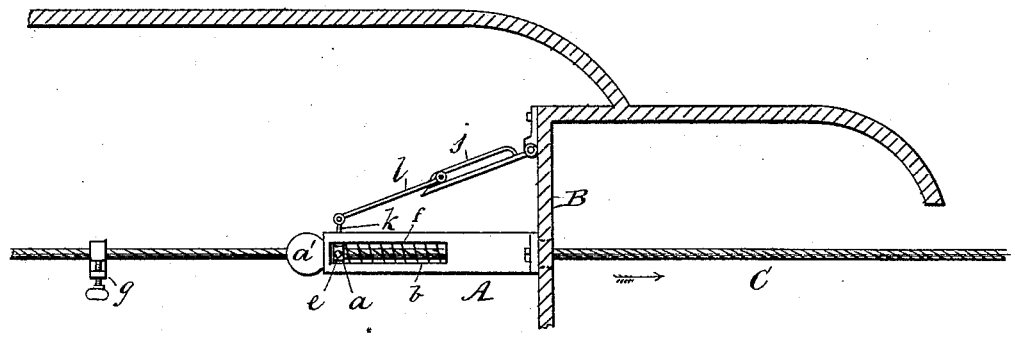
Fig. 2
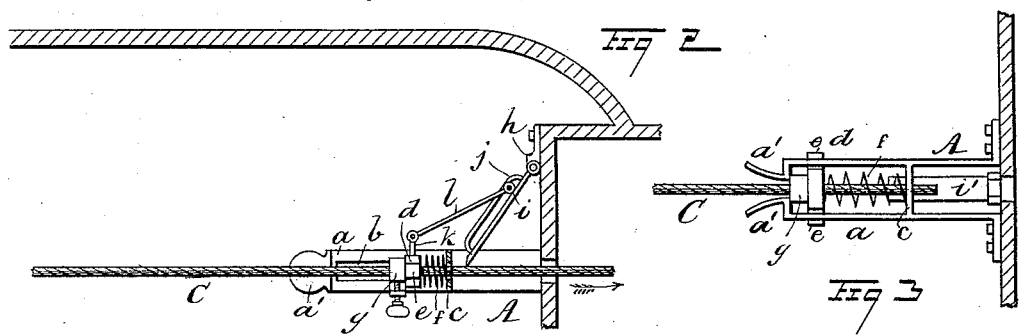
Fig. 3
Fig. 4
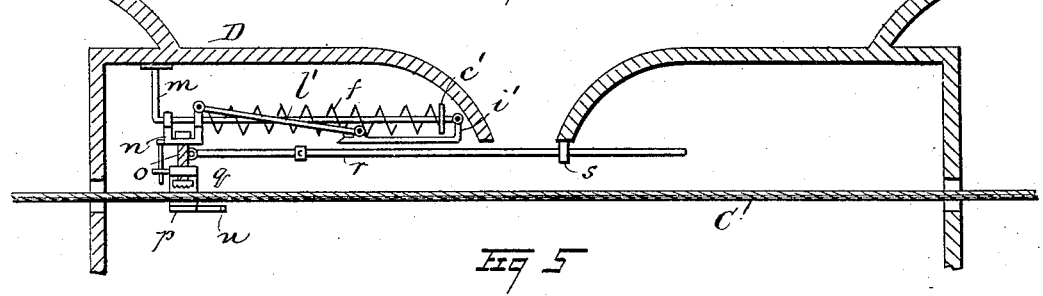
Fig. 5
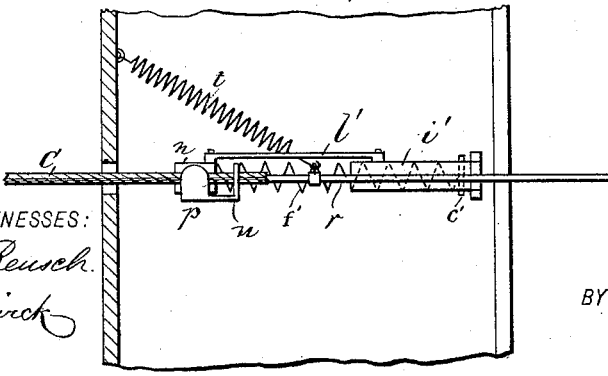
WITNESSES:
D. C. Reusch.
C. Sedgwick.
INVENTOR:
G. A. La Fever
BY Munn & Co.
ATTORNEYS (No Model.) 3 Sheets—Sheet 2.
G. A. LA FEVER.
BELL CORD ATTACHMENT.
No. 443,396. Patented Dec. 23, 1890.
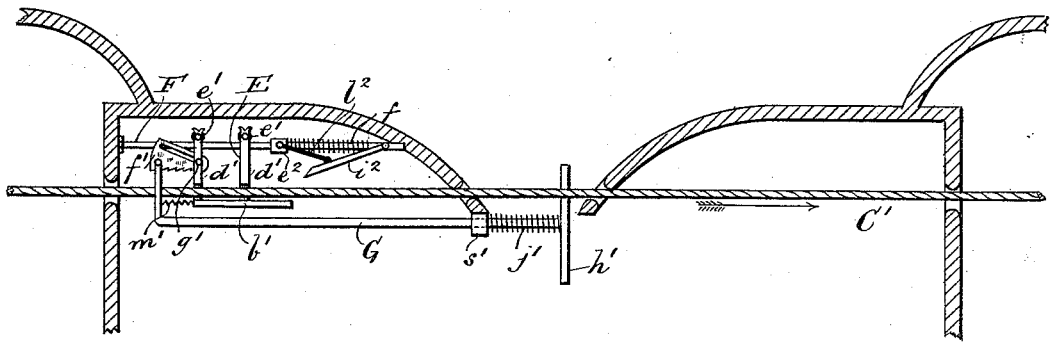
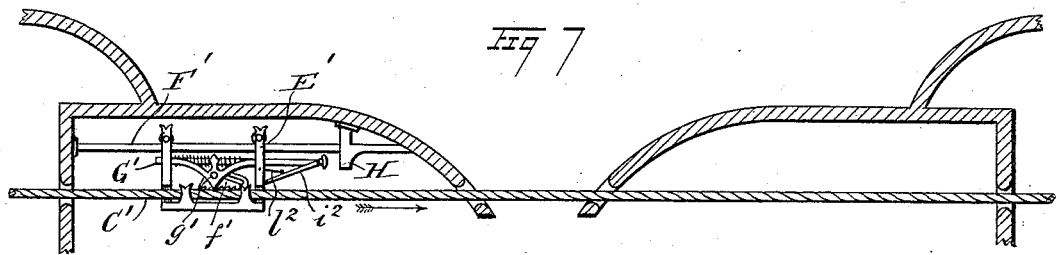
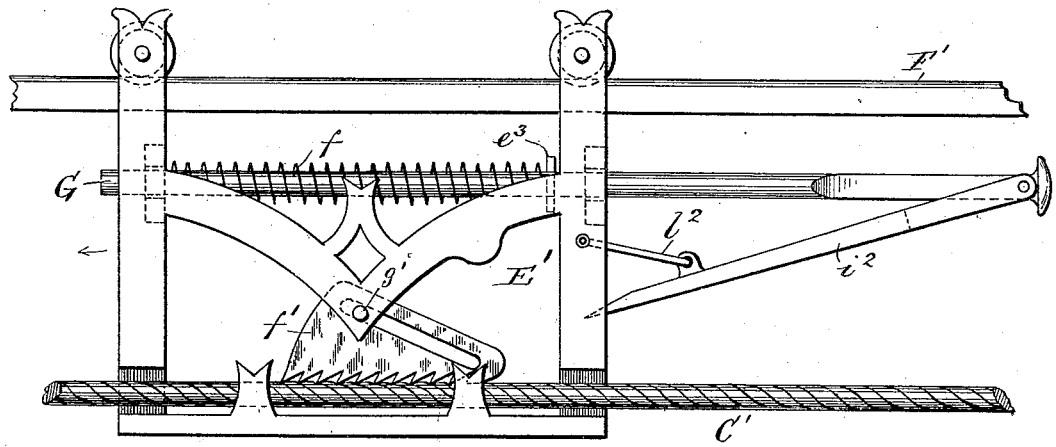
WITNESSES:
H. Walker
C. Sedgwick
INVENTOR:
G. A. La Fever
BY Munn & Co.
ATTORNEYS (No Model.) 3 Sheets—Sheet 3.

G. A. LA FEVER.
BELL CORD ATTACHMENT.

No. 443,396. Patented Dec. 23, 1890.

WITNESSES:
H. Walker
C. Sedgwick

INVENTOR:
G. A. La Fever
BY Munn & Co.
ATTORNEYS

UNITED STATES PATENT OFFICE.

GEORGE A. LA FEVER, OF SELKIRK, NEW YORK.

BELL-CORD ATTACHMENT.

SPECIFICATION forming part of Letters Patent No. 443,396, dated December 23, 1890.

Application filed December 12, 1889. Serial No. 333,447. (No model.)

*To all whom it may concern:*

Be it known that I, GEORGE A. LA FEVER, of Selkirk, in the county of Albany and State of New York, have invented a new and Improved Bell-Cord Attachment, of which the following is a specification, reference being had to the annexed drawings, forming a part thereof, in which—

Figure 9:
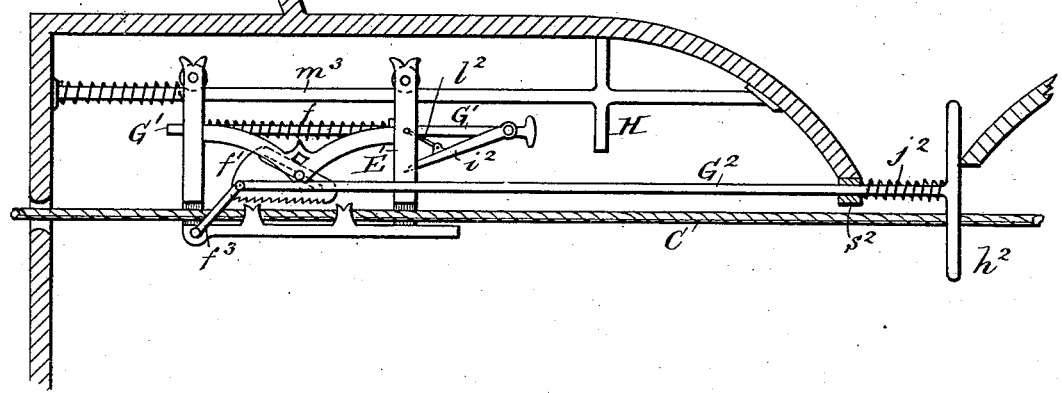
Figure 10:
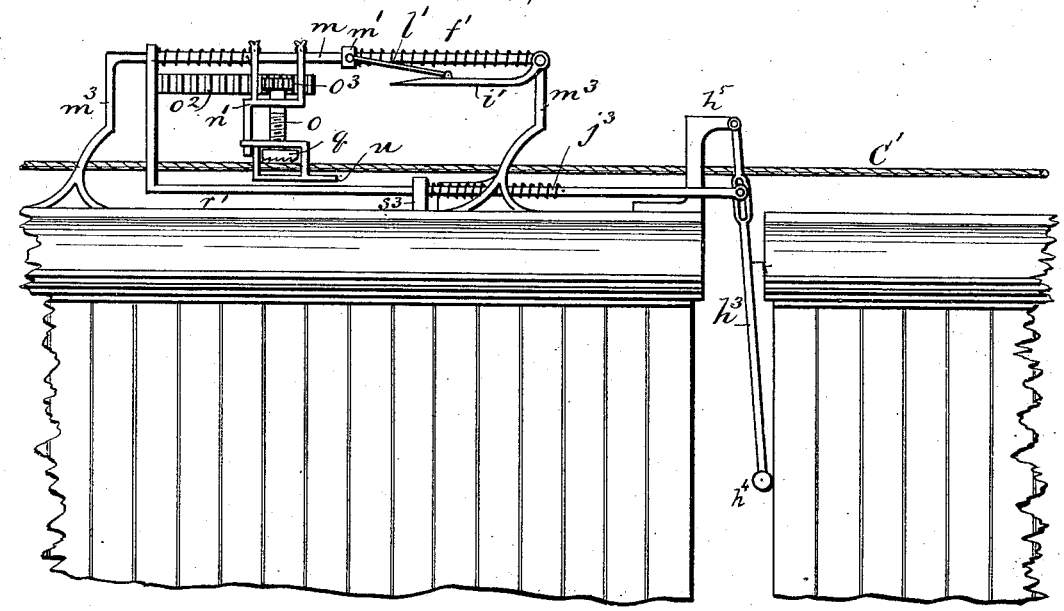

Figure 1 is a side elevation of my improved bell-cord attachment. Fig. 2 is a side elevation partly in section. Fig. 3 is an inverted plan view. Fig. 4 is a side elevation, and Fig. 5 is an inverted plan view of a modified form of my improvement. Fig. 6 is a side elevation of a form adapted to bell-cords passing out through the car-roof. Fig. 7 is a modified form of the same. Fig. 8 is an enlarged view of the clamping and cutting mechanism. Fig. 9 is a longitudinal section of cord-cutting mechanism arranged to be operated by the separation of the cars, and Fig. 10 represents cord-cutting apparatus adapted to freight-cars.

Similar letters of reference indicate corresponding parts in all the views.

The object of my invention is to furnish mechanism for attachment to passenger-cars of railways for clamping and cutting the bell-cord when the cars separate accidentally, thereby preventing the cord from being drawn rapidly through the cars and injuring the passengers.

My invention consists in the combination of a clamping device for holding the cord, and a knife or chisel and chisel-operating mechanism for cutting the cord, all as will be hereinafter more fully described.

In the form shown in Figs. 1, 2, and 3 a guide A, attached to the end B of a car, is provided with spring side pieces $a$, having longitudinal slots $b$ and furnished at their extremities with inwardly-projecting beveled catches $a'$. The side pieces $a$ are connected by a cross-piece $c$. Between the said side pieces $a$ is placed a follower $d$, having lugs $e$, which slide in the slots $b$. The cross-bar $c$ is apertured, and the bell-cord C passes loosely through the end of the car, through the cross-bar $c$, and through the follower $d$. Between the cross-bar $c$ and the follower $d$ is placed a spiral spring $f$, which tends to push the follower $d$ away from the cross-bar $c$. Upon the cord C is placed a clamp $g$.

To the end B of the car is attached an ear $h$, to which is pivoted a chisel $i$, having on the back thereof an oblong loop $j$. To a stud $k$, projecting upwardly from the follower $d$, is pivoted a connecting-rod $l$, the end of which is furnished with a pin passing through the loop $j$. With this construction, when the bell-cord C is drawn forward in the direction indicated by the arrow, the clamp $g$ passes between the catches $a'$ and is brought into contact with the follower $d$, thus moving the follower $d$ forward, causing the connecting-rod $l$ to push the chisel $i$ downward, as shown in Fig. 2, so as to cut the cord. After the release of the cord it is prevented from being drawn back by the engagement of the catches $a'$ with the clamp $g$, as shown in Fig. 3.

In the form shown in Figs. 4 and 5 upon the right-angled rod $m$, attached to the car-roof D, is placed a slide $n$, which carries a swiveled screw $o$, upon which is placed a loop $p$, the said loop being threaded, so as to engage the thread of the screw $o$. To the lower end of the said screw is attached a serrated head $q$, and to the screw $o$ is secured a lever $r$, the free end of which projects through an eye $s$, carried by the adjacent car. To the end of the car is attached one end of a spiral spring $t$, the other end of which is connected with the lever $r$. The said spring $t$ tends to draw the lever $r$ to one side, so that when the said lever is released from the eye $s$ by the separation of the cars the spring $t$ turns the screw $o$ and causes the serrated head $q$ to engage the bell-cord C' and clamp the same. To the free extremity of the rod $m$ is pivoted a chisel $i'$, which is connected with the slide $n$ by a connecting-rod $l'$. A spiral spring $f'$ is placed between the slide $n$ and the collar $c'$, near the end of the rod $m$. The said spring $f'$ tends to keep the slide at the inner end of the rod $m$. When the cars separate, the lever $r$, being released from the eye $s$, is drawn to one side, as already described, causing the screw $o$ to clamp the bell-cord C', when the slide $n$ is drawn forward with the cord until the connecting-rod $l'$ pushes down the chisel $i'$ and brings it into engagement with the cord, which rests upon the angled arm $u$, projecting from the loop $p$. After the cord is cut the end which is clamped by the screw $o$ is retained in the loop $p$ and prevented from flying back through the car.

In the form shown in Fig. 6 the frame E, formed of the horizontal bars $b'$ and vertical bars $d'$, is furnished with the rollers $e'$, which are supported by the rod F, attached to the end of the car near the roof. In a slot of one of the bars $d'$ is placed a slotted and serrated wedge $f'$, which is held in place by a pin $g'$ passing through the slotted bar $d'$ and through the slot of the wedge. A bar G passes through an eye $s'$, attached to the edge of the car-roof, and carries on its outer extremity a rod $h'$, between which and the eye $s'$ is placed a spiral spring $j'$, which surrounds the said rod G. The inner end of this rod is bent upwardly and pivoted to the wedge $f'$. To the forward end of the rod F is pivoted a chisel $i^2$, and on the said rod is placed a slide $e^2$, which is connected with the chisel $i^2$ by the connecting-rod $l^2$. In front of the slide $e^2$ and surrounding the rod F there is a spiral spring $f$, which presses the slide $e^2$ inwardly. Between the right-angled arm of the rod G and the bar $b'$ is placed a spiral spring $m'$, which holds apart the frame E and the right-angled end of the rod G during the normal working of the apparatus. As long as the train is properly connected the cord C' is free to move back and forth either way; but as soon as the cars separate the plate $h'$ is released and the spring $j'$ pushes it forward, carrying forward the serrated wedge $f'$, and, through the medium of the spring, moving forward the frame E until the said frame strikes the slide $e^2$, when the further movement of the rod G causes the serrated wedge $f'$ to come into contact with the cord C' and clamp it firmly in the frame E, when the said frame will be drawn forward with the cord, and by contact with the slide $e^2$ will push down the chisel $i^2$, by means of the connecting-rod $l^2$, thus causing the chisel to cut the cord.

In the form shown in Figs. 7 and 8 the construction is similar to that already described. Upon the rod F' is placed a frame E', which is open upon one side to receive the cord C". In the said frame is arranged a slotted serrated wedge $f'$ upon the pin $g'$, and in the frame is guided a rod G', to the forward end of which is pivoted a chisel $i^2$. A link or connecting-rod $l^2$ is pivotally connected with the free end of the chisel $i^2$ and also with the frame E'. Upon the rod G' is placed a spiral spring $f$, which abuts against the frame E' and presses against a collar $e^3$, attached to the rod G'. The serrated wedge $f'$ engages the bell-cord C', and when the frame E', and the parts connected therewith, is drawn to the extreme limit of its travel in the direction of the arrow the end of the rod G' strikes the buffer H, attached to the car-roof, and arrests its motion, while the frame E' continues to move on until, through the action of the link $l^2$, the chisel $i^2$ is made to sever the bell-cord.

In the form shown in Fig. 9 the frame E' is arranged to move along the rod $m^3$, which is suspended from the car-roof, and the said rod $m^3$ is provided with a buffer H for engaging the end of the rod G', as in Figs. 7 and 8. The frame E', and parts carried thereby, is the same as that already described, with the exception of a link $f^3$, which is pivoted to the lower part of the said frame E' and pivotally connected with the larger end of the serrated wedge $f'$. The same end of the wedge $f'$ is also pivoted to one end of a rod $G^2$, the other end of which projects through an eye $S^2$, attached to the edge of the car-roof, and is provided with a head $h^2$, which is adapted to touch the edge of the roof of the adjacent car. Upon the rod $G^2$, between the head $h^2$ and the eye $S^2$, is placed a spiral spring $J^2$, which tends to press the head $h^2$ outward, but is prevented from doing so by the contact of the head $h^2$ with the roof of the adjacent car. When the cars separate, the spring $J^2$ is allowed to act, carrying forward the rod $G^2$, thus moving the wedge $f'$ so as to bring it into engagement with the cord C', when the frame E' will be carried forward by the cord until the rod G' strikes the buffer H, when the chisel $i^2$ will be moved downward so as to sever the cord.

In the apparatus shown in Fig. 10 the rod $m$ is supported above the freight-car roof by standards $m^3$. In this case the construction of the frame $n'$ is the same as that shown in Fig. 4. The screw $o$ in the present case is provided with a pinion $o^3$, which is engaged by a rack $o^2$, carried by the angled rod $r'$. The said rod $r'$ extends through a guide $s^3$ and is pivotally connected with the lever $h^3$, which is fulcrumed on an arm $h^5$, attached to the car-roof. A spring $j^3$ surrounds the rod $r'$, one end thereof being secured to the rod, the other end abutting against the guide $s^3$. The spring $j^3$ tends to push the rod $r'$ and lever $h^3$ outward. The lower end of the lever $h^3$ is restrained by the adjacent car; but when the cars are separated, the lever $h^3$ being liberated, the spring $j^3$ acts, moving forward the rod $r'$, causing the serrated head $q$ of the screw to clamp the cord C', when the frame $n'$ will be drawn forward with the cord until the said frame, striking the slide $m'$, moves the said slide, and the slide, being connected with the chisel $i'$ by the lidk $l'$, moves the said chisel downward, causing it to cut the cord.

Having thus fully described my invention, I claim as new and desire to secure by Letters Patent—

1. In a bell-cord attachment, the combination of a clamping device for engaging the bell-cord, a pivoted chisel, and a link connected with the chisel at a point between its pivot and free end, holding it inclined toward the path of the cord, substantially as described.

2. In a bell-cord attachment, the combination, with the frame E', of the serrated wedge $f'$, the pivoted chisel $i^2$, the spring-pressed rod G', the link $l^2$, and the buffer H, substantially as specified.

GEORGE A. LA FEVER.

Witnesses:
W. N. GILL,
JOHN TURCK.